Patented Feb. 19, 1935

1,991,850

UNITED STATES PATENT OFFICE 1,991,850

TREATMENT OF EVERGREENS

Ralph E. Hall, Mount Lebanon, Pa., assignor to Hall Laboratory, Inc., Pittsburgh, Pa., a corporation of Pennsylvania No Drawing. Application August 18, 1933,
Serial No. 685,752

14 Claims. (Cl. 47—58)

The present invention relates to the treatment of evergreens, and more especially to the treatment of evergreen trees and shrubs grown in the polluted atmospheres commonly encountered in cities where soft coal is burned.

A great deal of difficulty has been encountered in attempting to grow evergreens in certain cities which have a smoky atmosphere. In fact, it is virtually impossible to grow evergreen shrubbery and trees in certain urban areas. The smoky atmosphere causes the formation upon the leaves of dense black colored films which appear to be composed of ash, soot and solid hydrocarbon particles, practically cemented to the leaf surfaces by tarry and oily bodies deposited by the smoke which may be mixed with certain waxy materials which are exuded from the leaves themselves. These films are practically waterproof, tightly adherent, and dark in color. They appear to shield the leaf surfaces from the necessary sunlight and also to seal the leaf surfaces against free access of the atmosphere, preventing the natural functioning of the leaves in the life of the plants. The decidious trees shed their leaves and grow new leaves in the spring. Such new leaves are not subjected to such harmful influences to the same extent as the evergreen leaves, since the smoke-deposited films are formed principally in the winter time when soft coal is burned in domestic heating appliances. While decidious trees and shrubs may be successfully grown in the smoky atmospheres of many cities, the evergreens die.

Water alone has no effect in removing such films. Even washing the shrubbery with soap and water has practically no effect upon such films, unless the individual leaves are scrubbed, which is impractical for general application. The ordinary soap solutions do not have sufficient emulsifying effect to remove these films from the leaves. If an attempt be made to increase the emulsifying effect of the soap by the addition of the usual emulsifying agents, such as soda ash, trisodium phosphate, or sodium silicate, the alkalinity is increased to a point where the foliage is damaged.

I have found that these difficulties may be completely overcome by cleansing the evergreen foliage with a solution containing an alkali-metal metaphosphate. Such solution has the requisite emulsifying properties to remove the contaminated waxy or tarry films which adhere to the leaf surfaces and at the same time has a sufficiently low alkalinity so as not to be injurious to the foliage.

The preferred procedure is to spray the foliage with a solution containing sodium metaphosphate and soap, keepng the foliage wet with such solution long enough to allow for the emulsification and loosening of the smoke-deposited films. A good solution for this purpose may be made by adding 4 pounds of sodium metaphosphate and ½ pound of a good vegetable-oil soap to 50 gallons of water. A small amount of sodium carbonate, or of a mixture of sodium carbonate and sodium bicarbonate, is preferably added to the sodium metaphosphate to neutralize its acidity and render its solution neutral or slightly alkaline. This solution is sprayed upon the foliage, which is kept wet with the solution for about ½ hour, which time appears to be sufficient to effect the loosening of the adherent films. Then the foliage is given a hard rinsing with plain water from an ordinary garden hose.

An examination of the evergreens after such treatment shows that the black colored film is removed, the foliage immediately restored to its natural brilliancy of coloring, and the evergreen plants given a new lease on life.

The sodium metaphosphate apparently has a remarkable effect in emulsifying and removing from the surfaces and the pores of the leaves the sooty waxy or tarry-like films which cause the death of the evergreens. This emulsification and removal may be effected by a solution which is neutral or but slightly alkaline. The sodium metaphosphate itself is slightly acid, having a pH value in dilute solution of about 6. It is preferable to adjust the solution used so that it has a pH value of about 8 to 8.5, thus making the soap most effective. The metaphosphate solution can have its alkalinity so adjusted by adding small amounts of sodium carbonate, sodium carbonate and sodium bicarbonate, or any other convenient alkaline reagent, preferably a buffering salt.

The waste cleansing solution which falls to the ground around the plants has a useful function as a fertilizer, since it supplies phosphate in soluble form to the roots of the plant.

The material which I prefer to use is sodium hexametaphosphate or Graham's salt. This may be prepared from monosodium dihydrogen orthophosphate by strongly heating to fusion and then quickly cooling to form a glass-like substance. The effect of the strong heating is to remove water from the molecular structure changing the monosodium dihydrogen orthophosphate ($NaH_2PO_4$) to the sodium metaphosphate ($NaPO_3$), which probably has the molecular formula $Na_2(Na_4P_6O_{18})$. The sodium metaphosphate molecule appears to be a very active molecule and to exert not only an emulsifying and detergent effect upon the waxy or tarry bodies which cement the solid smoke and dust particles upon the leaves, but also to exert a strong detergent effect upon the solid materials, particularly upon the dust which usually contains calcium and magnesium.

While I prefer to use the hexametaphosphate or Graham's salt, other water soluble metaphosphate salts may be used, such as the tetrametaphosphate, the trimetaphosphate, and the dimetaphosphate. The monometaphosphate is very difficultly soluble. While I prefer to use sodium metaphosphate because it is the most common and cheapest form, the metaphosphates of the other members of the class of alkalimetals may be used, such as those of potassium, ammonium, lithium, etc. While I prefer to add soap to the cleansing solution because of the well-known detergent properties of soap, the cleansing solution has been found to have a strong emulsifying and detergent effect when used alone in cleansing the evergreen leaves of the harmful adherent films. While I prefer to use a good mild vegetable oil soap, other soaps may be used, including soaps of the sulphated alcohol type.

While I have specifically described the preferred procedure in carrying out my invention, it is to be understood that the invention may be otherwise embodied and practiced within the scope of the following claims.

I claim:

1. The process of treating evergreens, which comprises cleansing their foliage with a dilute solution containing sodium metaphosphate.

2. The process of treating evergreens, which comprises cleansing their foliage with a dilute weakly alkaline solution containing sodium metaphosphate.

3. The process of treating evergreens, which comprises cleansing their foliage with a dilute solution containing sodium metaphosphate and soap.

4. The process of treating evergreens, which comprises cleansing their foliage with a dilute weakly alkaline solution containing sodium metaphosphate and soap.

5. The process of treating evergreens, which comprises cleansing their foliage with a dilute solution containing an alkali-metal metaphosphate.

6. The process of treating evergreens, which comprises cleansing their foliage with a dilute weakly alkaline solution containing an alkali-metal metaphosphate.

7. The process of treating evergreens, which comprises cleansing their foliage with a dilute solution containing an alkali-metal metaphosphate and soap.

8. The process of treating evergreens, which comprises cleansing their foliage with a dilute weakly alkaline solution containing an alkali-metal metaphosphate and soap.

9. The process of treating evergreens, which comprises cleansing their foliage with a dilute solution containing an alkali-metal hexametaphosphate.

10. The process of treating evergreens, which comprises cleansing their foliage with a dilute solution containing sodium hexametaphosphate.

11. The process of treating evergreens, which comprises cleansing their foliage with a dilute weakly alkaline solution containing an alkali-metal hexametaphosphate.

12. The process of treating evergreens, which comprises cleansing their foliage with a dilute weakly alkaline solution containing sodium hexametaphosphate.

13. The process of treating evergreens, which comprises cleansing their foliage with a dilute solution containing sodium hexametaphosphate and soap.

14. The process of treating evergreens, which comprises cleansing their foliage with a weakly alkaline solution containing sodium hexametaphosphate and soap.

RALPH E. HALL.

CERTIFICATE OF CORRECTION.

Patent No. 1,991,850.   February 19, 1935.

RALPH E. HALL.

It is hereby certified that the name of the assignee in the above numbered patent was erroneously described and specified as "Hall Laboratory, Inc." whereas said name should have been described and specified as Hall Laboratories, Inc., as shown by the records of assignments in this office; and that the said Letters Patent should be read with this correction therein that the same may conform to the record of the case in the Patent Office.

Signed and sealed this 9th day of April, A. D. 1935.

Leslie Frazer (Seal)   Acting Commissioner of Patents